(12) United States Patent
Kramer et al.

(10) Patent No.: US 9,501,442 B2
(45) Date of Patent: Nov. 22, 2016

(54) CONFIGURABLE PERIPHERAL COMPONENENT INTERCONNECT EXPRESS (PCIE) CONTROLLER

(71) Applicants: David B. Kramer, Cedar Park, TX (US); Thang Q. Nguyen, Austin, TX (US)

(72) Inventors: David B. Kramer, Cedar Park, TX (US); Thang Q. Nguyen, Austin, TX (US)

(73) Assignee: FREESCALE SEMICONDUCTOR, INC., Austin, TX (US)

(*) Notice: Subject to any disclaimer, the term of this patent is extended or adjusted under 35 U.S.C. 154(b) by 384 days.

(21) Appl. No.: 14/265,847

(22) Filed: Apr. 30, 2014

(65) Prior Publication Data
US 2015/0317266 A1    Nov. 5, 2015

(51) Int. Cl.
*G06F 13/368* (2006.01)
*G06F 13/40* (2006.01)
*G06F 13/16* (2006.01)
*G06F 13/42* (2006.01)

(52) U.S. Cl.
CPC ....... *G06F 13/4027* (2013.01); *G06F 13/1642* (2013.01); *G06F 13/1673* (2013.01); *G06F 13/368* (2013.01); *G06F 13/4022* (2013.01); *G06F 13/4221* (2013.01)

(58) Field of Classification Search
USPC .................. 710/123, 105, 310, 313, 316
See application file for complete search history.

(56) References Cited

U.S. PATENT DOCUMENTS

| 6,769,043 | B1 | 7/2004 | Fedorkow et al. | |
|---|---|---|---|---|
| 7,424,566 | B2* | 9/2008 | Manula et al. | 710/310 |
| 7,657,688 | B2 | 2/2010 | Atherton et al. | |
| 8,358,651 | B1* | 1/2013 | Kadosh et al. | 370/360 |
| 2013/0262734 | A1 | 10/2013 | Yap et al. | |
| 2014/0122769 | A1* | 5/2014 | Su et al. | 710/314 |
| 2014/0229650 | A1* | 8/2014 | Fowler | 710/304 |
| 2015/0269108 | A1* | 9/2015 | Spry et al. | 710/310 |
| 2015/0269109 | A1* | 9/2015 | Spry et al. | 710/310 |

FOREIGN PATENT DOCUMENTS

| EP | 2466485 A1 | 6/2012 |
|---|---|---|
| WO | 2009148432 A1 | 12/2009 |

OTHER PUBLICATIONS

"Intel Platform for Smaller Footprint Communications Infrastructure Systems", Platform Brief, Intel Platform for Communications Infrastructure, (http://www.intel.com/content/dam/www/public/us/en/documents/platform-briefs/smaller-footprint-communications-infrastructure-platform-brief.pdf), Copyright © 2012 Intel Corporation, pp. 1-4.

* cited by examiner

Primary Examiner — Khanh Dang

(57) ABSTRACT

In an system on a chip, multiple PCIe controllers may be present in which each PCIe controller may be configured to route input data to either itself or to another PCIe controller based on a priority level of the input data. Similarly, each PCIe controller may be configured to route output data by way of its own PCIe link or that of another PCIe controller based on a scheduling order which may be based on a priority level of the buffer in which the output data is stored. In this manner, multiple PCIe controllers which, in a first mode, are capable of operating independently from each other can be configured, in a second mode, to provide multiple channels for a single PCIe link, in which each channel may correspond to a different priority level.

20 Claims, 2 Drawing Sheets

CONFIGURABLE PERIPHERAL COMPONENENT INTERCONNECT EXPRESS (PCIE) CONTROLLER

BACKGROUND

Field

This disclosure relates generally to Peripheral Component Interconnect Express (PCIe) controllers, and more specifically, to configurable PCIe controllers.

Related Art

Currently, multiple PCIe controllers are placed into System on Chips (SoCs) to maximize connectivity provided for peripherals. Each PCIe controller allows for a connection to a particular component. Having multiple PCIe controllers can prevent the need for an expensive external discrete PCIe switch. However, based on the specific application of the SoC, not all the PCIe controllers may be required and thus end up being unused. This results in wasted silicon area and sometimes static power dissipation on the SoC. Therefore, a need exists for an SoC with improved efficiency for PCIe controllers.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In an SoC, multiple PCIe controllers may be present in which each PCIe controller may be configured to route input data to either itself or to another PCIe controller based on a priority level of the input data. Similarly, each PCIe controller may be configured to route output data by way of its own PCIe link or that of another unused PCIe controller based on a scheduling order which may be based on a priority level of the buffer in which the output data is stored. For example, with respect to data ingress, a PCIe controller receives input packet data (which may also be referred to as a transaction-level packet) at a PCIe link of the PCIe controller. A packet decoder at the data link layer of the PCIe controller determines a priority of the input packet data and based on the priority, determines whether the input packet data is stored in an ingress buffer of the PCIe controller or in an ingress buffer of another unused PCIe controller. With respect to data egress, a scheduler at the data link layer of the PCIe controller determines whether output packet data stored in an egress buffer of the PCIe controller or in an egress buffer of another unused PCIe controller is provided at the PCIe link of the PCIe controller based on the priority of the egress buffer with respect to the egress buffers of other PCIe controllers. In this manner, multiple PCIe controllers which, in a first mode, are capable of operating independently from each other can be configured, in a second mode, to provide multiple channels for a single PCIe link, in which each channel may correspond to a different priority level.

Figure 1:
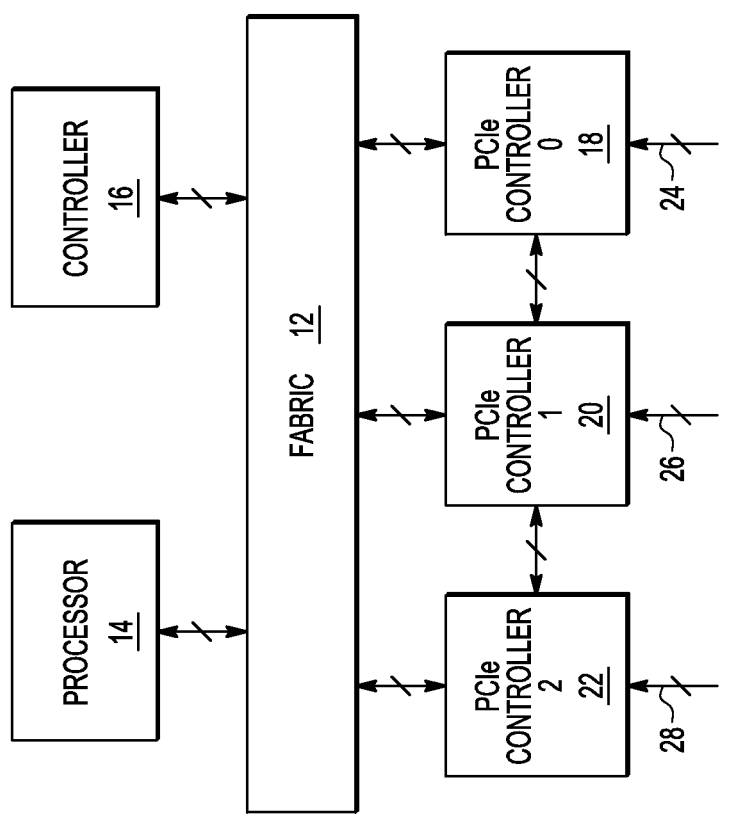
FIG. 1 illustrates, in block diagram form, a system in accordance with one embodiment of the present invention.

FIG. 1 illustrates, in block diagram form, a system 10 in accordance with one embodiment of the present invention. System 10 may be implemented as an SoC and thus be located on a single integrated circuit. System 10 includes a processor 14, a controller 16, a fabric 12, a PCIe controller 0 18, a PCIe controller 1 20 and a PCIe controller 2 22, and PCIe links 24, 26, and 28. Processor 14, controller 16, and each of PCI controllers 18, 20, and 22 are bidirectionally coupled to fabric 12. Fabric 12 allows includes interconnects and circuitries which allow the components of system 10 to communicate with each other. For example, fabric 12 may be implemented as a crossbar switch. Processor 14 can be any type of processor and can provide packet data to any of PCIe controllers 18, 20, and 22, and may receive packet data from any of PCIe controllers 18, 20, and 22. Controller 16 can be any type of controller which may communicate with other components of system 10 or may communicate with any of PCIe controllers 18, 20, and 22. For example, controller 16 may be a memory controller, such as a dual data rate (DDR) memory controller. PCIe controllers 18, 20, and 22 communicate external to system 10 by way of PCIe link 24, 26, and 28, respectively. For example, each of PCIe link 24, 26, and 28 provides a PCIe port of system 10 to which a component or peripheral may be coupled. Note that system 10 may include any number of processors, any number of controllers, and any number of PCIe controllers, each of which may be referred to as a module of system 10. Also, system 10 may include additional modules, such as a memory module or other I/O module.

In operation, processor 14 may perform read or write transactions with components coupled to any of PCIe link 24, 26, and 28. For example, for a write transaction, processor 14 can provide data to the appropriate PCIe controller coupled to the target component, and for a read transaction, the appropriate PCIe controller coupled to the target component receives input data by way of its PCIe link and can provide that data back to processor 14. Similarly, note that a component coupled to a PCIe controller can perform read or write transactions on a target module within system 10. In general, incoming packet data to a PCIe controller by way of its PCIe link is stored into an appropriate ingress buffer or ingress storage circuitry within the PCIe controller which can then be provided to fabric 12 to be routed to the appropriate module, such as processor 14. Outgoing packet data to be provided by a PCIe controller by way of its PCIe link is received from the module providing the data, such as processor 14, by way of fabric 12. The outgoing data received from fabric 12 is stored into an appropriate egress buffer or egress storage circuitry within the PCIe controller which can then be provided by way to the PCIe link to the component coupled to the PCIe link.

In one embodiment, each PCIe controller corresponds to a particular channel, where each channel has use of the resources within the PCIe controller. For example, in FIG. 1, PCIe controller 18 may correspond to a first channel (channel 0), PCIe controller 20 may correspond to a second channel (channel 1), and PCIe controller 22 may correspond to a third channel (channel 2). In a first mode of operation, each channel is capable of independently communicating packet data between the component coupled to the PCIe link of the channel and fabric 12. In this first mode, each channel only has access to the resources within the corresponding PCIe controller of the channel. Therefore, resources such as ingress and egress buffer space is limited for each channel. In a second mode of operation, the buffer resources of two or more of the PCIe controllers can be configured to provide multiple channels for a single PCIe link of one of the two or more PCIe controllers. In this mode of operation, the ingress buffers in each of the two or more PCIe controllers still provides for multiple channels in which each ingress buffer of the two or more PCIe controllers corresponds to a separate channel having a different priority level. For example, in this mode of operation, any unused PCIe controller may be configured to provide an additional channel to a PCIe controller that is being used. Furthermore, packet decoders in the data link layer of each PCIe controller can inspect the incoming data packets to determine a priority of the incoming data and thus determine how to route the incoming packet data to the appropriate channel, and thus appropriate PCIe controller. The incoming packet data may then be stored in the ingress buffers of the appropriate PCIe controller.

Figure 2:
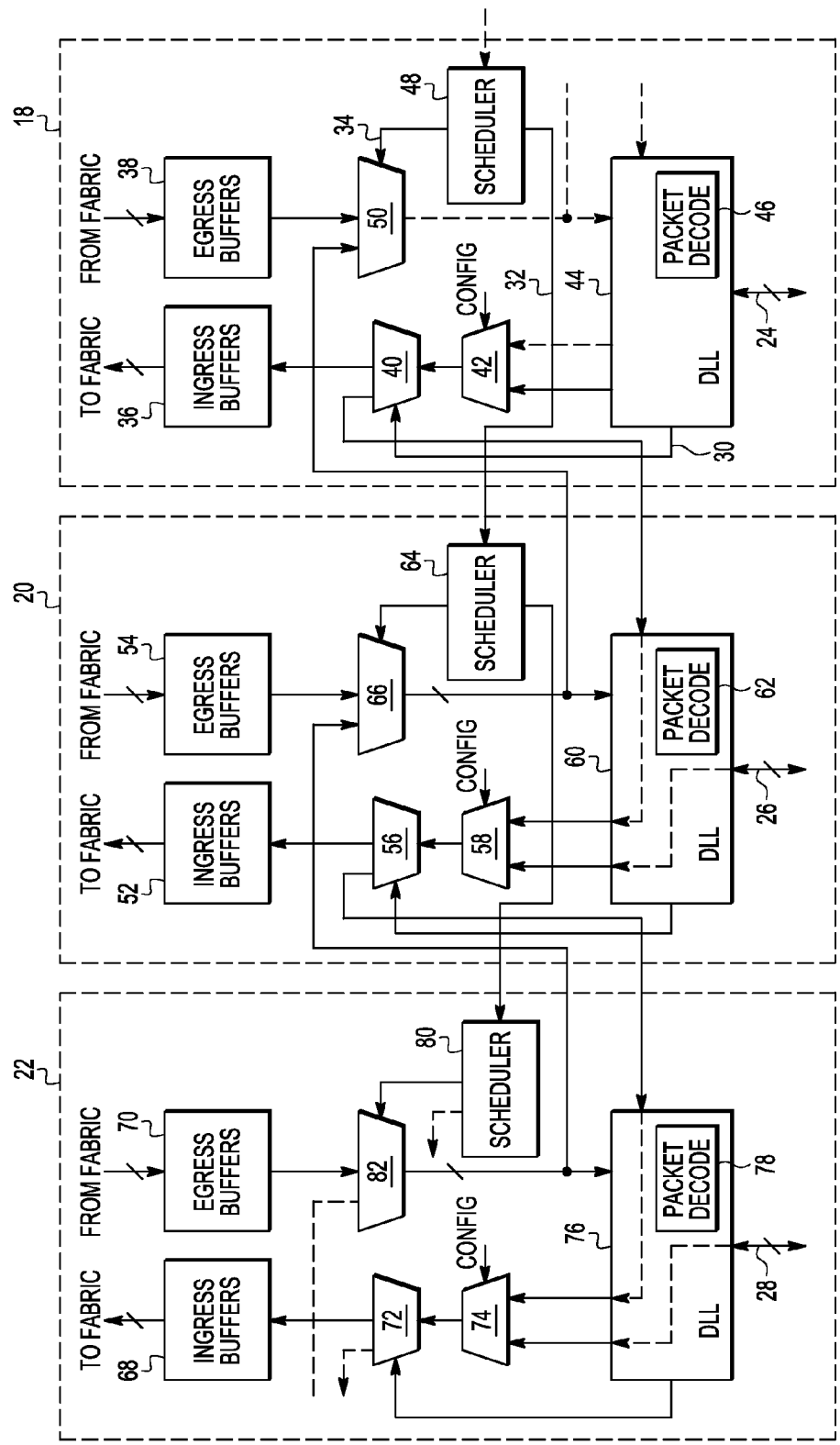
FIG. 2 illustrates, in block diagram form, PCIe controllers of FIG. 1 in accordance with one embodiment of the present invention.

FIG. 2 illustrates, in block diagram form, further details of PCIe controllers 18, 20, and 22 of FIG. 1. PCIe controller 18 includes ingress buffers 36, egress buffers 38, multiplexers (MUXes) 34 and 42, a demultiplexer (deMUX) 40, a scheduler 48, and a data link layer (DLL) 44. Note that the elements outside of DLL 44 and PCIe link 24 correspond to the transactional layer of PCIe controller 18. DLL 44 includes a packet decode unit 46. PCIe controller 20 includes ingress buffers 52, egress buffers 54, MUXes 66 and 58, a deMUX 56, a scheduler 64, and a DLL 60. Note that the elements outside of DLL 60 and PCIe link 26 correspond to the transactional layer of PCIe controller 20. DLL 60 includes a packet decode unit 62. PCIe controller 22 includes ingress buffers 68, egress buffers 70, MUXes 82 and 74, a deMUX 72, a scheduler 80, and a DLL 76. Note that the elements outside of DLL 76 and PCIe link 28 correspond to the transactional layer of PCIe controller 22. DLL 76 includes a packet decode unit 78. Connectivity will be described with respect to PCIe controller 18 in which the connectivity of buffers 52, 54, MUXes 66 and 58, deMUX 56, scheduler 64, and DLL 60 of PCIe controller 20 and of buffers 68, 70, MUXes 82 and 74, deMUX 72, scheduler 80, and DLL 76 of PCIe controller 22 are analogous to the connectivity of buffers 36, 38, MUXes 34 and 42, deMUX 40, scheduler 48, and DLL 44 of PCIe controller 18, respectively.

Referring to PCIe controller 18, ingress buffers include one or more buffers which may be used to store input data for a write request, read request, or read response to a module of system 10, such as controller 16, by a component coupled to PCIe link 24 or to store input data which is being provided by the component coupled to PCIe link 24 to a module of system 10 or a read request requested data of system 10. An output of ingress buffers is therefore coupled to fabric 12 so that it may provide input data or request from the one or more buffers to a module of system 10. Egress buffers include one or more buffers which may be used to store output data for a write request by a module of system 10 to a component coupled to PCIe link 24 or to store output data from a module of system 10 in response to a read request to that module by the component coupled to PCIe link 24 or a read request from a module of system 10 to a component coupled to PCIe link 24. An input of egress buffers is therefore coupled to fabric 12 so that it may receive and store output data from a module of system 10.

An output of egress buffers 38 is coupled to a first data input of MUX 50, and a second data input of MUX 50 is coupled to receive output packet data from PCIe controller 20. A control input of MUX 50 is coupled to receive a control signal 34 from scheduler 48. An output of MUX 50 is coupled to DLL 44 and may also provide an output to another PCIe controller of system 10, as indicated by the dotted line from the output of MUX 50. MUX 50 may be referred to as egress transaction-level selection logic and control signal 34 may be referred to as an egress transaction steering signal. In alternate embodiments, different circuitry, other than a MUX, may be used to implement the function of the selection logic. Scheduler 48 is coupled to provide an output to scheduler 64 of PCIe controller 20. Scheduler 48 may also receive an input from another PCIe controller of system 10, as indicated by the dotted line into scheduler 48.

A first data input of MUX 42 is coupled to DLL 44, which is bidirectionally coupled to PCIe link 24. A second input data of MUX 42 is coupled to DLL 44 which may receive input packet data from another PCIe controller of system 10 as indicated by the dotted line into DLL 44 and the dotted line from DLL 44 to the second input of MUX 42. A control input of MUX 42 is coupled to receive a configuration signal (config). An output of MUX 42 is coupled to an input of deMUX 40. A first output of deMUX 40 is coupled to an input of ingress buffers 36, and a second output of deMUX 40 is coupled to DLL 60 of PCIe controller 20. A control input of deMUX 40 is coupled to a control signal 30 provided by packet decode 46 from DLL 44. DeMUX 40 may be referred to as ingress transaction-level selection logic and control signal 30 may be referred to as an ingress transaction steering signal. In alternate embodiment, different circuitry, other than a deMUX may be used to implement the function the selection logic. Also, note that different circuitry, other than a MUX, may be used to implement the selection function of MUX 42.

Note that the connectivity of the other PCIe controllers of system 10 is similar to that described above in reference to PCIe controller 18. The ingress buffers in each PCIe controller can be configured to receive input packet data from its own PCIe link or from the PCIe link of another PCIe controller. For example, referring to PCIe controller 20, input packet data may be received by ingress buffers 52 from PCIe link 26 by way of DLL 60, the first data input of MUX 58, and the second data output of deMUX 56, or from PCIe controller 18 by way the first data output of deMUX 40, DLL 60, the second data input of MUX 58, and the second data output of deMUX 56. In the latter case, the input packet data which is provided by the first data output of deMUX 40 to DLL 60 may be input packet data received from PCIe link 24, via DLL 44, and the first data input of MUX 42 or may be input packet data which is provided by yet another PCIe controller which is routed to DLL 44 and provided to the second data input of MUX 42. The egress buffers in each PCIe controller can be configured to provide output packet data to its own PCIe link or to the PCIe link of another PCIe controller. For example, referring to PCIe controller 20, output packet data may be provided by egress buffers 54 to PCIe link 26 by way of MUX 66 and DLL 60 or to the first data input of MUX 50 by way of MUX 66. In the latter case, the output packet data received at the first data input of MUX 50 may be provided to data link 24 by way of DLL 44 or may be routed to the egress transaction-level selection logic of yet another PCIe controller.

During a first mode of operation, each PCIe controller is configured to receive input packet data from its own PCIe data link. For example, referring to PCIe controller 18, input packet data, config is set to provide the first data input of MUX 42 as the data output of MUX 42, and control signal 30 is set by DLL 44 to provide the data input of deMUX 40 as the second data output of deMUX 40 to ingress buffers 36. Also, scheduler 48 sets control signal 34 such that the second data input of MUX 50 is provided as the data output of MUX 50 to DLL 44. Analogous description applies to PCIe controllers 20 and 22 during this first mode of operation, in which each PCIe controller operates independent of each other, communicating with its own PCIe link and ingress/egress buffers. In this mode of operation, each PCIe controller corresponds to a separate channel.

During a second mode of operation, a number of PCIe controllers can be chained to implement that number of separate channels, but while using the PCIe link of only one PCIe controller. In this manner, unused PCIe controllers may be used to implement additional channels for a PCIe controller. In the illustrated embodiment of FIG. 2, the resources of PCIe controllers 18 and 20, such as the ingress/egress buffers, each provide additional channels for use by with PCIe link 24. Therefore, a component coupled to PCIe link 24 has access to a first channel corresponding to PCIe controller 18 as provided by ingress/egress buffers 36/38, to a second channel corresponding to PCIe controller 20 as provided by ingress/egress buffers 52/54, and to a third channel corresponding to PCIe controller 22 as provided by ingress/egress buffers 68/70. Furthermore, for input packet data, each channel corresponds to a different priority level thus allowing each channel to have a different quality of service (QoS). PCIe is a transaction level protocol in which the data packets include both data and associated commands. The header of a data packet may include commands and configuration information for the data packet. Therefore, in one embodiment, the priority level determination is accomplished by a packet decode at the DLL which determines a priority level of each input packet data, such as by decoding the header information of the packet. The type of information which may be inspected from the packet data (header or other portion of the data packet) to determine the priority level includes identification of a virtual channel, identification of a traffic class, or identification of an address range, a transaction type, or combinations thereof. Based on the priority level, the DLL sets the control input of the ingress transaction-level selection logic accordingly.

In the illustrated embodiment, PCIe controllers 18, 20, and 22 are chained and are configured to use PCIe link 24. Therefore, the config signal to MUX 42 is set such that the first data input of MUX 42 is provided as the data output of MUX 42. The config signal to MUX 58 is set such that the second data input of MUX 58 is provided as the data output of MUX 58. In this manner, any input packet data stored into ingress buffers 52 is received by DLL 60 from the first data output of deMUX 40 of PCIe controller 18 and not from PCIe link 26. The config signal to MUX 74 is set such that the second data input of MUX 74 is provided as the data output of MUX 74. In this manner, any input packet data stored into ingress buffers 68 is received by DLL 76 from the first output of deMUX 56 of PCIe controller 20 and not from PCIe link 28. Furthermore, with this configuration, the input packet data received from the first output of deMUX 56 was previously received by DLL 60 from the first data output of deMUX 40 of PCIe controller 18 and thus from PCIe link 24.

In one embodiment, the first channel (corresponding to PCIe controller 18) has a first priority level, the second channel (corresponding to PCIe controller 20) has a second priority level lower than the first priority level, and the third channel (corresponding to PCIe controller 22) has a third priority level lower than the second priority level. For each input packet data received by PCIe link 24, packet decode 46 determines the priority level of that packet and sets control signal 30 accordingly. If packet decode 46 determines that the decoded priority level of a received packet matches the priority level of the first channel, control signal 30 is set to route the output of MUX 42 to the second data output of deMUX 40 and thus to ingress buffers 36. Therefore, the input packet data gets stored in ingress buffers 36. If, however, packet decode 46 determines that the priority level of that packet does not match the priority level of the first channel, control signal 30 is set to allow the output of MUX 42 be provided as the first data output of deMUX 40 and thus to DLL 60. Packet decode 62 within DLL 60 decodes the received input data packet to determine the priority level and sets the control signal to deMUX 56 accordingly. If the priority level decoded by packet decode 62 matches the priority level of the second channel, the control signal to deMUX 56 is set to allow the output of MUX 58 to be provided to ingress buffers 52 so that the input data packet is stored in ingress buffers 52. If, however, the priority level does not match the priority level of the second channel, the control signal to deMUX 56 is set to allow the output of MUX 58 to be provided to DLL 76 of PCIe controller 22. Packet decode 78 then decodes the input data packet to determine the priority level to determine if the input data packet is to be stored in ingress buffers 68 and sets the control signal to deMUX 72 accordingly. If additional PCIe controllers were chained, this process of processing an input data packet would continue.

By having each packet decode in the DLL of each PCIe controller determine, in turn, the priority level of an input data packet received at PCIe link 24, different channels having different priority levels can be maintained. In current designs, ingress buffer space for a particular PCIe controller (and thus for a particular channel) has been increased in various ways. In one current design, the ingress buffer space for a particular channel has been increased by allowing the PCIe controller to continue using ingress buffer space in unused PCIe controllers. However, this only increases the buffering size in one channel and does not allow an increased number of channels which share a PCIe link. Furthermore, this allows for only a single priority level. In contrast, various embodiments of the current invention allow for the increased number of channels provided by the chained PCIe controllers to each have a different priority level and thus a different QoS. In this manner, increased flexibility may be achieved over current designs.

During the second mode of operation, the egress buffers of each PCIe controller share PCIe link 24. As discussed above, each PCIe controller, and thus each set of egress buffers, has a corresponding priority level. The module (such as processor 14) stores output packet data into the appropriate egress buffers in accordance with the priority level of the packet data. The output packet data from the egress buffers is provided to PCIe link 24 as determined by the schedulers. For example, scheduler 48 sets control signal 34 to provide the first input of MUX 50 as the output of MUX 50. If PCIe link 24 is enabled (which would be the case if PCIe controller 18 is an in-use PCIe controller), the output packet data is provided by DLL 44 to PCIe link 24. Scheduler 48 may indicate to scheduler 64 that it is done outputting data and set the control input to MUX 50 to provide the second input of MUX 50 as the output of MUX 50. In response to the indication, scheduler 64 sets the control input to MUX 66 to provide the first input of MUX 66 as the output of MUX 66. In this case, since PCIe controller 20 is unused, PCIe link 26 is not enabled. Therefore, the output of MUX 66 is not provided by way of DLL to PCIe link 26 but is provided to the second data input of MUX 50 which is now provided as the output of MUX 50. In this case, the output packet data from egress buffers 54 is provided, by way of MUX 66, MUX 50, and DLL 44 to PCIe link 24. Scheduler 64 may then indicate to scheduler 80 that it is done outputting data and set the control input of MUX 66 to provide the second input of MUX 66 as the output of MUX 66. Scheduler 80 may then set the control input to MUX 82 to provide the first input of MUX 82 as the output of MUX 82. In this case, output packet data from egress buffers 70 is provided, by way of MUX 82, MUX 66, MUX 50, and DLL 44 to PCIe link 24.

Note that schedulers 48, 64, and 80 may provide any type of scheduling order for outputting packet data from the egress buffers. For example, in one embodiment, the scheduling order is associated with the priority level, such that the egress buffers in the channel of higher priorities get selected before those of lower priority, by setting the egress transaction steering signal (e.g. signal 34) to control the egress transaction-level selection logic (e.g. MUX 50) accordingly. Alternatively, a round-robin, weighted round-robin, or other fair share scheduling algorithms may be implemented.

In one embodiment, whether the PCIe controllers operate independently, such as in the first mode of operation, or chained in some fashion, as in the second mode of operation, is determined by configuration logic (not shown) within system 10 at start-up of system 10. This configuration logic may determine, for example, which, if any, are the un-used PCIe controllers which may be chained with an in-use PCIe controller. In one embodiment, the configuration of the PCIe controllers may be changed during operation of system 10, after start-up.

Therefore, by now it can be appreciated how one or more unused PCIe controllers can be chained with an in-use PCIe controller to provide multiple PCIe channels which share a PCIe link of the in-use PCIe controller. Furthermore, these multiple PCIe channels may each have a different priority level in which the priority level of an input data packet may be determined in order to appropriately route the input data packet to the ingress buffers of the appropriate channel.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. For example, any number of reconfigurable PCIe controllers may be present in system 10. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, a peripheral component interconnect express (PCIe) controller includes an ingress buffer; an egress buffer; a first ingress transaction-level selection logic configured to select a first or a second data input signal as an ingress data signal, wherein: the second data input signal originates from a second PCIe controller; and the first ingress transaction-level selection logic is enabled by a configuration signal; a second ingress transaction-level selection logic communicatively coupled to the first ingress transaction-level selection logic, the second ingress transaction-level selection logic configured to: receive the ingress data signal from the first ingress transaction-level selection logic; and communicate the ingress data signal to the ingress buffer or a second packet decoder based at least on an ingress transaction steering signal, wherein the ingress transaction steering signal is configured to indicate a priority level associated with the ingress data signal, the priority level having been decoded at a transaction level by a first packet decoder; and an egress transaction-level selection logic configured to select a first or a second data output signal to an egress data signal, wherein: the second data output signal originates from the second PCIe controller; and the egress transaction-level selection logic is enabled by an egress transaction steering signal, the egress transaction steering signal configured to indicate a scheduling order associated with the PCIe controller and the second PCIe controller. In one aspect of the above embodiment, the scheduling order is associated with the priority level. In another aspect, the controller includes a scheduler configured to provide the egress transaction steering signal to the egress transaction-level selection logic. In a further aspect, the scheduler is further configured to provide an egress transaction grant signal to an egress transaction-level selection logic of the second PCIe controller. In another aspect, the controller further includes a data link layer communicatively coupled to the first ingress transaction-level selection logic and the egress transaction-level selection logic. In a further aspect, the first packet decoder is an integral part of the data link layer. In another aspect, the controller further includes a PCIe link, the PCIe link providing the first data input signal. In another aspect, the configuration signal is configured to configure the first ingress transaction-level selection logic as part of a startup process. In another aspect, the priority level is associated with a result of a transaction-level packet inspection process. In a further aspect, the result comprises an identification of a virtual channel, the virtual channel being one of a plurality of virtual channels associated with the ingress data signal. In a further aspect, the result comprises an identification of a traffic class, the traffic class being one of a plurality of traffic classes associated with the ingress data signal. In another further aspect, the result comprises an identification of an address range, the address range being one of a plurality of address ranges associated with the ingress data signal. In another further aspect, the scheduling order comprises a round-robin scheduling order. In another further aspect, the scheduling order comprises a fair share scheduling order.

In another embodiment, a peripheral component interconnect express ("PCIe") controller includes a data link layer configured to: receive a first data input from a PCIe link; receive a second data input from a second PCIe controller; and selectively decode a transaction-level packet from either the first or second data input in order to determine a priority level associated with the transaction-level packet; and generate an ingress transaction steering signal based at least on the priority level; and a transaction layer configured to: receive the first or second data inputs from the data link layer; receive the ingress transaction steering signal from the data link layer; receive a first data output signal from a fabric communicatively coupled to the PCIe controller; receive a second data output signal from the second PCIe controller; selectively communicate the first or second data output signal to the data link layer based at least on a scheduling order associated with the PCIe controller and the second PCIe controller; and selectively communicate the first or second data inputs to the fabric or the second PCIe controller based at least on the priority level associated with the transaction-level packet, wherein the priority level associated with the PCIe controller is different from the priority level associated with the second PCIe controller. In one aspect of the above another embodiment, the scheduling order is associated with a scheduling value, the scheduling value selected from the group comprising: the priority level, a round robin value, and a weighted round robin value. In another aspect, the priority level is associated with a result of a transaction-level packet inspection process, the result being selected from the group comprising: an identification of a virtual channel, an identification of a traffic class, and an identification of an address range. In another aspect, the transaction layer is further configured to receive a configuration signal, the configuration signal configured to configure a selection logic associated with the selective communication of the first and second data inputs as part of a startup process.

In yet another embodiment, an apparatus includes a processor; a fabric communicatively coupled to the processor; and a plurality of PCIe controllers communicatively coupled to the fabric, wherein each of the plurality of PCIe controllers are communicatively coupled to one or more of its neighboring PCIe controllers, each of the plurality of PCIe controller including: a data link layer configured to: receive a first data input signal from a PCIe link; receive a second data input signal from a second PCIe controller, the second PCIe controller being one of the plurality of PCIe controllers and one of the neighboring PCIe controllers; and selectively decode a transaction-level packet from either the first or second data input signal in order to determine a priority level associated with the transaction-level packet; and generate an ingress transaction steering signal based at least on the priority level; and a transaction layer configured to: receive the first or second data input signal from the data link layer; receive the ingress transaction steering signal from the data link layer; receive a first data output signal from a fabric communicatively coupled to the PCIe controller; receive a second data output signal from the second PCIe controller; selectively communicate the first or second data output signal to the data link layer based at least on a scheduling order associated with the PCIe controller and the second PCIe controller; and selectively communicate the first or second data input signals to the fabric or the second PCIe controller based at least on the priority level associated with the transaction-level packet, wherein the priority level associated with the PCIe controller is different from the priority level associated with the second PCIe controller. In another aspect, transaction layer is further configured to receive a configuration signal, the configuration signal configured to configure a selection logic associated with the selective communication of the first and second data input signals as part of a startup process.

What is claimed is:

1. A peripheral component interconnect express (PCIe) controller comprising:
   an ingress buffer;
   an egress buffer;
   a first ingress transaction-level selection logic configured to select a first or a second data input signal as an ingress data signal, wherein:
      the second data input signal originates from a second PCIe controller; and
      the first ingress transaction-level selection logic is enabled by a configuration signal;
   a second ingress transaction-level selection logic communicatively coupled to the first ingress transaction-level selection logic, the second ingress transaction-level selection logic configured to:
      receive the ingress data signal from the first ingress transaction-level selection logic; and
      communicate the ingress data signal to the ingress buffer or a second packet decoder based at least on an ingress transaction steering signal, wherein the ingress transaction steering signal is configured to indicate a priority level associated with the ingress data signal, the priority level having been decoded at a transaction level by a first packet decoder; and
   an egress transaction-level selection logic configured to select a first or a second data output signal to an egress data signal, wherein:
      the second data output signal originates from the second PCIe controller; and
      the egress transaction-level selection logic is enabled by an egress transaction steering signal, the egress transaction steering signal configured to indicate a scheduling order associated with the PCIe controller and the second PCIe controller.

2. The controller of claim 1, wherein the scheduling order is associated with the priority level.

3. The controller of claim 1, further comprising a scheduler configured to provide the egress transaction steering signal to the egress transaction-level selection logic.

4. The controller of claim 3, wherein the scheduler is further configured to provide an egress transaction grant signal to an egress transaction-level selection logic of the second PCIe controller.

5. The controller of claim 1, further comprising a data link layer communicatively coupled to the first ingress transaction-level selection logic and the egress transaction-level selection logic.

6. The controller of claim 5, wherein the first packet decoder is an integral part of the data link layer.

7. The controller of claim 1, further comprising a PCIe link, the PCIe link providing the first data input signal.

8. The controller of claim 1, wherein the configuration signal is configured to configure the first ingress transaction-level selection logic as part of a startup process.

9. The controller of claim 1, wherein the priority level is associated with a result of a transaction-level packet inspection process.

10. The controller of claim 9, wherein the result comprises an identification of a virtual channel, the virtual channel being one of a plurality of virtual channels associated with the ingress data signal.

11. The controller of claim 9, wherein the result comprises an identification of a traffic class, the traffic class being one of a plurality of traffic classes associated with the ingress data signal.

12. The controller of claim 9, wherein the result comprises an identification of an address range, the address range being one of a plurality of address ranges associated with the ingress data signal.

13. The controller of claim 1, wherein the scheduling order comprises a round-robin scheduling order.

14. The controller of claim 1, wherein the scheduling order comprises a fair share scheduling order.

15. A peripheral component interconnect express ("PCIe") controller comprising:
a data link layer configured to:
receive a first data input from a PCIe link;
receive a second data input from a second PCIe controller; and
selectively decode a transaction-level packet from either the first or second data input in order to determine a priority level associated with the transaction-level packet; and
generate an ingress transaction steering signal based at least on the priority level; and
a transaction layer configured to:
receive the first or second data inputs from the data link layer;
receive the ingress transaction steering signal from the data link layer;
receive a first data output signal from a fabric communicatively coupled to the PCIe controller;
receive a second data output signal from the second PCIe controller;
selectively communicate the first or second data output signal to the data link layer based at least on a scheduling order associated with the PCIe controller and the second PCIe controller; and
selectively communicate the first or second data inputs to the fabric or the second PCIe controller based at least on the priority level associated with the transaction-level packet, wherein the priority level associated with the PCIe controller is different from the priority level associated with the second PCIe controller.

16. The controller of claim 15, wherein the scheduling order is associated with a scheduling value, the scheduling value selected from the group comprising: the priority level, a round robin value, and a weighted round robin value.

17. The controller of claim 15, wherein the priority level is associated with a result of a transaction-level packet inspection process, the result being selected from the group comprising: an identification of a virtual channel, an identification of a traffic class, and an identification of an address range.

18. The controller of claim 15, wherein the transaction layer is further configured to receive a configuration signal, the configuration signal configured to configure a selection logic associated with the selective communication of the first and second data inputs as part of a startup process.

19. An apparatus comprising:
a processor;
a fabric communicatively coupled to the processor; and
a plurality of PCIe controllers communicatively coupled to the fabric, wherein each of
the plurality of PCIe controllers are communicatively coupled to one or more of its neighboring PCIe controllers, each of the plurality of PCIe controller comprising:
a data link layer configured to:
receive a first data input signal from a PCIe link;
receive a second data input signal from a second PCIe controller, the second PCIe controller being one of the plurality of PCIe controllers and one of the neighboring PCIe controllers; and
selectively decode a transaction-level packet from either the first or second data input signal in order to determine a priority level associated with the transaction-level packet; and
generate an ingress transaction steering signal based at least on the priority level; and
a transaction layer configured to:
receive the first or second data input signal from the data link layer;
receive the ingress transaction steering signal from the data link layer;
receive a first data output signal from a fabric communicatively coupled to the PCIe controller;
receive a second data output signal from the second PCIe controller;
selectively communicate the first or second data output signal to the data link layer based at least on a scheduling order associated with the PCIe controller and the second PCIe controller; and
selectively communicate the first or second data input signals to the fabric or the second PCIe controller based at least on the priority level associated with the transaction-level packet,
wherein the priority level associated with the PCIe controller is different from the priority level associated with the second PCIe controller.

20. The apparatus of claim 19, wherein the transaction layer is further configured to receive a configuration signal, the configuration signal configured to configure a selection logic associated with the selective communication of the first and second data input signals as part of a startup process.

* * * * *